US008959553B1

(12) United States Patent  
Pan et al.

(10) Patent No.: US 8,959,553 B1  
(45) Date of Patent: *Feb. 17, 2015

(54) VISUAL PRESENTATION OF VIDEO RECOMMENDATIONS

(75) Inventors: Yu Pan, San Francisco, CA (US); Jasson Schrock, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/105,227

(22) Filed: May 11, 2011

Related U.S. Application Data

(63) Continuation of application No. 11/955,298, filed on Dec. 12, 2007, now Pat. No. 7,966,632.

(51) Int. Cl.
*H04N 5/445* (2011.01)
*G06F 3/00* (2006.01)
*G06F 13/00* (2006.01)

(52) U.S. Cl.
USPC .................................. 725/46; 725/45; 725/47

(58) Field of Classification Search
CPC .......... H04N 21/252; H04N 21/25891; H04N 21/4312; H04N 21/4826
See application file for complete search history.

(56) References Cited

U.S. PATENT DOCUMENTS

| 6,925,610 | B2* | 8/2005 | Thurston et al. ............. 715/811 |
| 7,966,632 | B1 | 6/2011 | Pan et al. |
| 2003/0126601 | A1* | 7/2003 | Roberts et al. ................. 725/37 |
| 2004/0003396 | A1* | 1/2004 | Babu .............................. 725/34 |
| 2006/0032363 | A1* | 2/2006 | Platt .............................. 84/601 |
| 2007/0033007 | A1* | 2/2007 | Narahara et al. ................. 704/9 |
| 2007/0288965 | A1* | 12/2007 | Murakami et al. ............. 725/46 |
| 2008/0060007 | A1* | 3/2008 | Matsubayashi et al. ........ 725/39 |
| 2009/0006397 | A1* | 1/2009 | Lehtiniemi et al. .............. 707/7 |
| 2009/0019488 | A1* | 1/2009 | Ruiz-Velasco et al. ......... 725/43 |

OTHER PUBLICATIONS

Mayur Data, Google News Personalization: Scalable Online Collaborative Filtering, May 2007 www2007/Track: Inductrial Practice and Experience, p. 271-280.*

Das, A., et al., "Google News Personalization: Scalable Online Collaborative Filtering," WWW 2007, Track: Industrial Practice and Experience, May 8-12, 2007, pp. 271-280, ACM.

Toshiba, "Satellite® A55 Series User's Guide," Aug. 2004, pp. 210-212.

* cited by examiner

*Primary Examiner* — Rong Le
(74) *Attorney, Agent, or Firm* — Fenwick & West LLP (57) ABSTRACT

A system, method and various user interfaces enable visually browsing multiple groups of video recommendations. A group of video recommendations includes a central video and a set of related videos displayed at its corresponding display distance from the central video and from each other. The corresponding display distance of a video is calculated as a function of the video's recommendation score and correlation with other videos of the group. The recommendation score is generated based on a weighted covisitation measure. Visually presenting recommended videos to a user provides a quick and intuitive way to find videos of interest and visualize the browsing of the recommended videos.

17 Claims, 8 Drawing Sheets

VISUAL PRESENTATION OF VIDEO RECOMMENDATIONS

CROSS-REFERENCE TO RELATED APPLICATIONS

This application is a continuation of U.S. application Ser. No. 11/955,298, filed on Dec. 12, 2007, entitled "Visual Presentation of Video Recommendations" which is incorporated herein by reference in its entirety.

TECHNICAL FIELD

The described embodiments of the present invention relate generally to web-based video searching, and specifically to searching video repositories in an online video content distribution system.

BACKGROUND

The expansion of the Internet and the World Wide Web has enabled computer users to explore media in various different forms and in various different ways. Video content sharing on websites has developed into a worldwide phenomenon, supported by many websites. On average, over 10,000 videos are posted every day, and this number is increasing as the tools and opportunities for capturing video become easy to use and more widespread. The vastness of a video repository hosted by a video hosting website causes users to rely on search engines as one way to retrieve videos of interest.

A typical search engine takes user input in forms of search terms or keywords, searches through a video database to find videos that match the user's query and returns search results. For example, if videos are transcribed or otherwise labeled with text, text retrieval techniques can be used to locate videos of interest for users. Other video retrieval methods, such as content-based queries and metadata queries, can be used to find videos that match the user's search terms.

Many conventional formats for presenting search results use a list of links, URLs, or thumbnails. Each individual link in the list represents a video that satisfies the user's query, and points to a location where the video is stored in the video database. However, even the search results generated by the most sophisticated video content analysis will be of little value unless it can be presented in an easy and appealing manner for a user to consume the results. For example, due to the vastness of a video repository hosted by a video hosting website, some search results often contain a long list of links, and a user is not able to visually see whether a video found by the search engine truly contains the relevant content without actually playing the video. Compounding this, a long list of links does not provide a visual presentation of the correlation among the videos in the list.

SUMMARY

The embodiments of the present invention enable visual browsing of multiple groups of video recommendations in a quick and intuitive way, including a method, system, and computer program product that receives a command from a client computer requesting a service of visually browsing multiple groups of video recommendations and provides the requested service to the client computer. A method in accordance with an embodiment of the present invention includes displaying a default group of video recommendations, receiving from a client computer a selection of a central video, generating a new group of video recommendations in response to the client selection and visually displaying multiple groups of video recommendations to the client. A system in accordance with an embodiment includes a visual video browsing server, and a visual presentation module and a recommendation module executed by the visual browsing server. The visual presentation module monitors user events associated with multiple groups of video recommendations. The visual presentation module further coordinates visual display of a plurality of video recommendations groups in a display area. The recommendation module generates a group of video recommendations based on the client selection of a central video, including relating a set of videos of a group related to a central video of the group using a weighted covisitation measure, generating a recommendation score of a video based on its weighted covisitation score, and relating a video of the group to another video of the group. A computer program product for the visual browsing of a plurality of groups of video recommendations in one embodiment includes a receiving module for receiving a selection of a central video from a group of video recommendations from a client computer, generating a group of video recommendations in response to the client selection and displaying multiple groups of video recommendations in a display area.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

The Figures and descriptions of the present invention have been simplified to illustrate elements that are relevant for a clear understanding of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
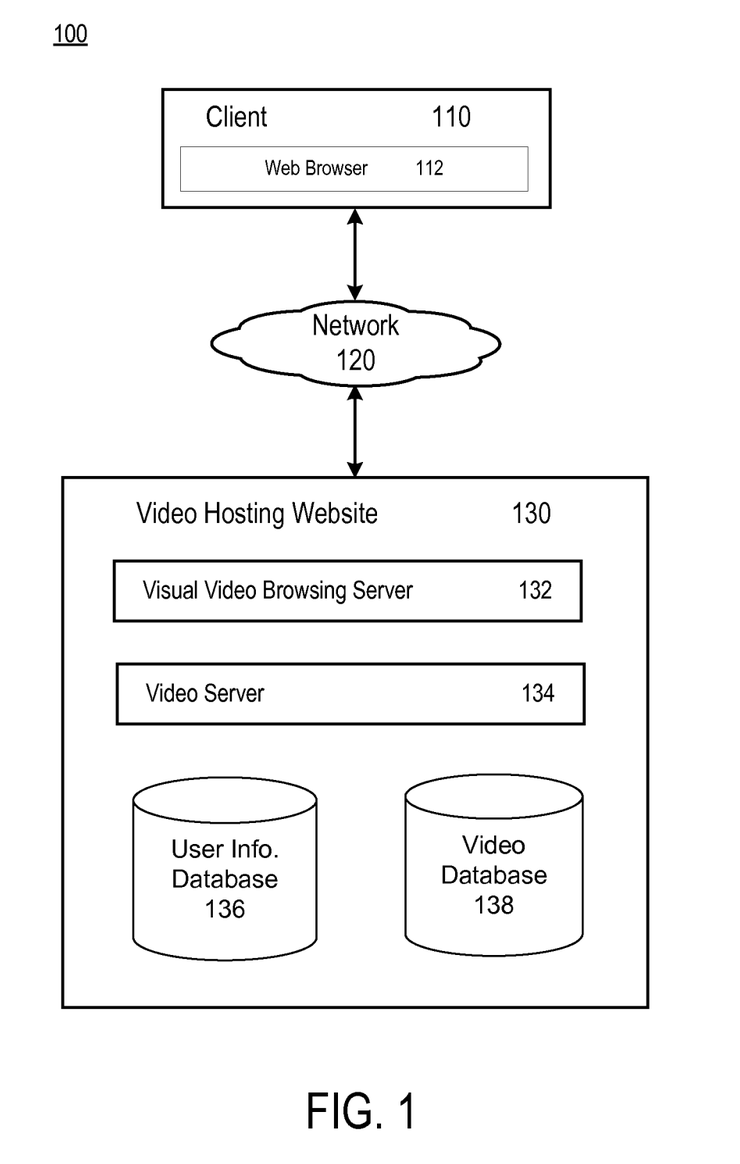
FIG. 1 is a block diagram of a system architecture for providing a visual presentation of video recommendations according to one embodiment.

FIG. 1 is a block diagram of a system architecture 100 for providing visual presentation of browsing video recommendations according to one embodiment. As shown in FIG. 1, a client 110 is connected to a video hosting website 130 via a computer network 120. The client 110 executes a web browser 112. The video hosting website 130 comprises a visual video browsing server 132, a video server 134, a user information database 136 and a video database 138. Many conventional features, such as firewalls, load balancers, application servers, failover servers, site management tools, and so forth are not shown so as to more clearly illustrate the features of the system.

The client 110 communicates with the video hosting website 130 via the computer network 120. The client 110 can be a personal computer (PC) in one embodiment, or a mobile handset or other electronic computing devices in other embodiments. While only a single client 110 and web browser 112 are shown, it is understood that very large numbers (e.g., thousands or more) of clients are supported and can be in communication with the website 130 at any time. In some embodiments, the browser 112 uses a third party video player (e.g., the Flash™ player from Adobe Systems, Inc.), or any other player adapted for the video file formats used on the site 130. Typically, a user accesses a video from the site 130 by browsing a catalog of videos, conducting searches on keywords, reviewing playlists from other users or the system administrator (e.g., collections of videos forming channels), or viewing videos associated with particular user groups (e.g., communities). In some embodiments, browser 112 also accesses a video file indirectly, via an embedded video that is accessed via an embedded hyperlink in a third party website.

Users of the client 110 and browser 112 can upload content (which can include, for example, video, audio, or still images, or a combination of video and audio and still images) to the site 130 and browse media content stored at the site 130 via the network 120. The uploaded content is processed and placed for storage in the video database 138. This processing can include format conversion, compression, metadata tagging, and other data processing. In some embodiments, an uploaded content file is associated with the uploading user, and so the user's account record is updated in the user information database 136 as needed. In some embodiments, other data relating to the user is also placed for storage in database 136. For example, in one embodiment, a list of videos that have been viewed by the user over the last ten days is associated with a user ID and is kept in the user information database 136.

The network 120 enables communications among the client 110 and the video hosting website 130. In one embodiment, the network 120 uses standard communications technologies and/or protocols. Thus, the network 120 can include links using technologies such as Ethernet, 802.11, integrated services digital network (ISDN), digital subscriber line (DSL), asynchronous transfer mode (ATM), etc. The network 120 may also support mobile access using technologies such as Wideband Code Division Multiple Access (W-CDMA), CDMA200, Global System for Mobile Communications (GSM), General Packet Radio Service (GPRS), or similar technologies. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above.

For purposes of convenience and the description of one embodiment, the media content uploaded and browsed by a user will be referred to a "videos" or "video files", but no limitation on the types of media content that can be uploaded and browsed are intended by this terminology.

The video hosting website 130 allows users to upload videos to the website 130 and browse the videos stored in the website 130. A suitable website 130 for implementation of the system is the YOUTUBE™ website, found at www.youtube.com; other video hosting sites are known as well, and can be adapted to operate according the teaching disclosed herein. The various servers are conventionally implemented, whether as a single piece of software or hardware or as multiple pieces of software or hardware. In general, functions described in one embodiment as being performed on the server side can also be performed on the client side in other embodiments if appropriate.

The visual video browsing server 132 provides an intuitive way for users to quickly visualize and browse of videos of interest. The visual video browsing server 132 monitors user interface events, generates video recommendations and visually displays the recommendations to users via a display. The visual video browsing server 132 displays the recommended videos in orbit around a central video, i.e., the current focus of interest, with the video most recommended for the central video being the closest in the display. When a user changes his/her focus of interest to another video, the visual video browsing server 132 regenerates the recommendations around the new focus of interest, and visually displays the newly generated recommendations in the display 218. The initial recommendations are kept on the screen so that user can easily and quickly scroll back to them. As such, video browsing becomes "live" such that a user can not only visually see a single browsing process of a group of recommendations, but also visualize multiple video browsing processes in the same display area. Further detail on visually displaying the video recommendations is presented in connection with the discussion of FIG. 5.

Figure 2:
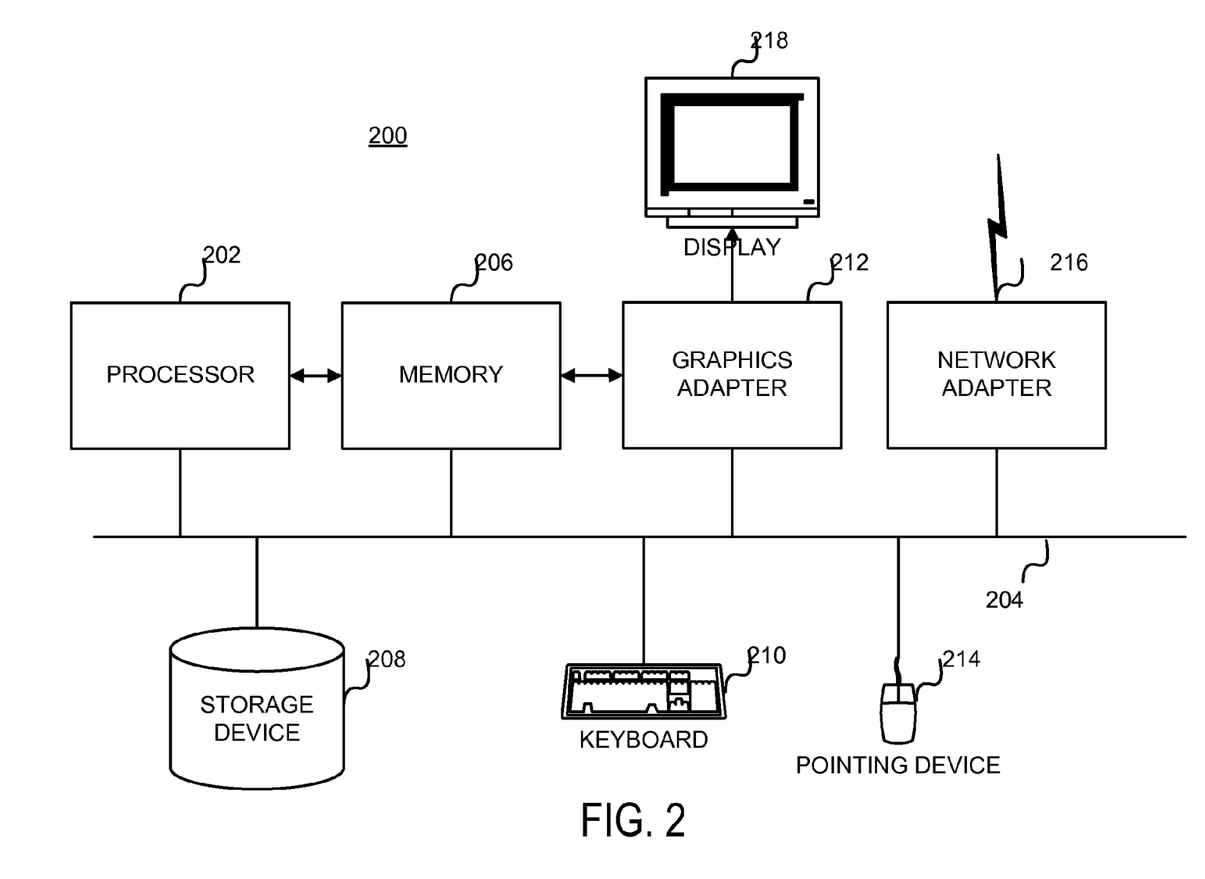
FIG. 2 is a block diagram of a client computer for browsing videos on a video server according to one embodiment.

FIG. 2 is a high-level block diagram of a computer 200 for acting as a client 110, a visual video browsing server 132, a video server 134 and managers of user information database 136 and video database 138 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a server 116 can lack a keyboard 210, pointing device 214, graphics adapter 212, and/or display 218. Moreover, the storage device 208 can be local and/or remote from the computer 200 (such as embodied within a storage area network (SAN)).

Figure 5:
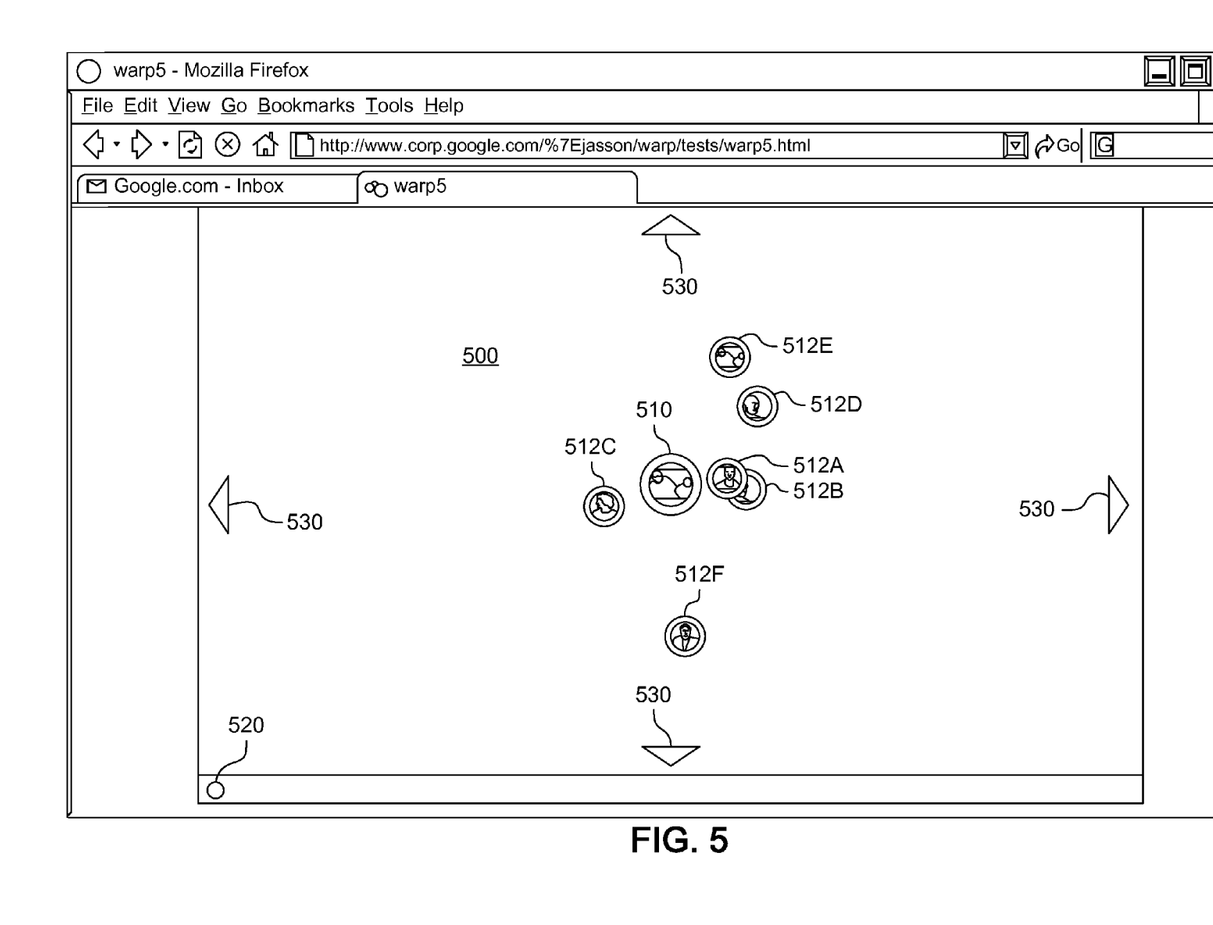
FIG. 5 illustrates a web page implementing an exemplary interface for visually presenting a single group of video recommendations in a display area according to one embodiment.

Referring now to FIG. 5, an exemplary interface for visually presenting a single group of video recommendations is illustrated according to one embodiment. The exemplary interface includes a video recommendation browsing/display window 500, a group of video recommendations including a central video 510, directional display controls 530 and a type of service indication 520 (in this case, it is a video browsing service). The video recommendation browsing window 500 is already, in the illustrated case, displaying a group of videos recommended by a recommendation engine. The relative correlation among the recommended videos is also visually displayed.

More specifically, in the illustrated case a total of seven videos are recommended and each recommended video is represented by a video icon. In one embodiment, the video icon is a thumbnail image of a key frame to give an overview of the visual content in the recommended video. A relatively large video icon of the current central video 510 is displayed in the center of the display window 500. Six more smaller video icons, 512A-512F, each of which represents a recommended video 512 related to the central video 510, are displayed surrounding the central video 510 at its respective distance from the central video 510. For purposes of convenience and the description of one embodiment, the recommended videos 512 related to the central video 510 will be referred to below as an "orbiting videos" of the central video 510. For each orbiting video 512 of the central video 510, its displayed distance from the central video 510 represents a probability of being watched next given the current central video 510 being watched further influenced by its correlation to other orbiting videos 512. For example, the orbiting video 512A, which is closest in distance to the central video 510, is most likely to be watched next by this user among other orbiting videos 512 based on factors discussed further below. As such, the relativeness of each orbiting video 512 to the central video 510 is visually displayed in terms of its physical distance from the central video 510 in the display window 500. At the same time, the relative correlation between each orbiting video 512 is also visually displayed in terms of the relative distance towards each other. Each orbiting video 512 has a probability of being watched next given the central video 510 being watched. Such conditional probability associated with each orbiting video 512 is calculated by the recommendation engine 320 of the visual video browsing server 132. Further detail on generating video recommendations is presented in connection with the discussion of FIG. 3.

Figure 3:
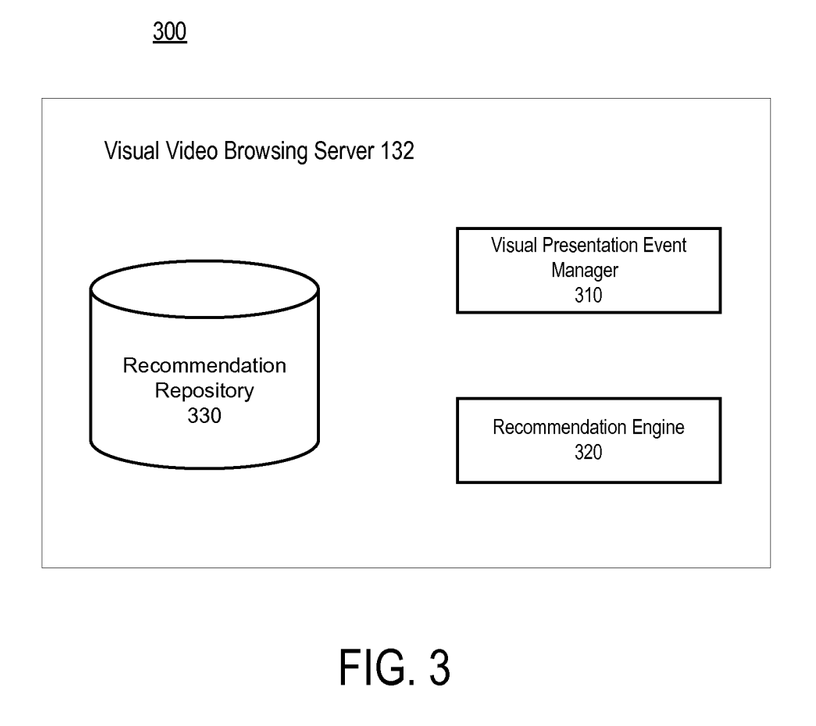
FIG. 3 is a block diagram illustrating modules within a visual video browsing server according to one embodiment.

FIG. 3 is a block diagram illustrating modules within a visual video browsing server 132 according to one embodiment. In one embodiment, the visual video browsing server 132 includes a visual presentation event manager 310, a recommendation engine 320 and a recommendation repository 330. Other embodiments can have different and/or additional modules than the ones shown in the figure. In addition, the functions can be distributed among the modules in a different manner than is described here.

The visual presentation event manager 310 is configured to monitor visual presentation events. One group of the visual presentation events is related to user interface events, such as mouse movements, keyboard inputs, user selections and updates to the display 218. Another group of the visual presentation events is generated by the recommendation engine 320. The event manager 310 is also configured to instruct the recommendation engine 320 to calculate recommendations based on user interface events, receive the recommendations from the recommendation engine 320, and visually present the recommendations to the user. In one embodiment, the recommendation engine 320 generates recommendations at a speed in relation to the video frame rate of currently selected central video. For example, the frame rate of the currently selected central video is 15 frames per second. The recommendation engine 320, in one embodiment, generates recommendations every 5 minutes. In another example, the currently selected central video is 60 frames per second, the recommendation engine 320 may generates recommendations every 2 minutes. In another embodiment, the recommendation engine 320 generates recommendations upon the instructions from the visual presentation manager 310. For each group of recommendations generated, the recommendation engine 320 notifies the visual presentation manager 310 and stores the recommendations in the recommendation repository 330.

Videos in a video repository such as the video database 138 in the website 130 can be related by the recommendation engine 320 in various ways. For example, the recommendation engine 320 may relate various videos based on video content and/or a user's specific interests or past behavior.

In one embodiment, the recommendation engine 320 relates videos using a weighted covisitation measure, and generates a recommendation score for each orbiting video around a central video based on the weighted covisitation measure. The recommendation score of an orbiting video represents a conditional probability of being watched next given the central video being watched. The term "covisitation" in the context of this description refers to an event in which a video watched by a viewer is also watched by other viewers. For example, in a covisitation for A and B, a user watches video A, and then video B. The number of covisitations of videos A and B is then 1, since they are watched by just one user. The recommendation score of video B being watched next given video A being watched is equal to the ratio of number of covisitation of both videos A and B to the number of covisitation of video A, which is 1 in this example. For a single user case as above, the recommendation engine 320 calculates the recommendation score of video B using the equation (1) below:

$$\text{score}(\text{video}_B) = \frac{\text{num\_co}(\text{video}_A \cap \text{video}_B)}{\text{num\_co}(\text{video}_A)} \quad (1)$$

where $\text{score}(\text{video}_B)$ is the recommendation score of video B; $\text{num\_co}(\text{video}_A \cap \text{video}_B)$ represents the number of covisitation of both videos A and B; $\text{num\_co}(\text{video}_A)$ is the number of covisitation of video A.

In a video hosting website 130 like YOUTUBE, a video is often watched by tens of thousands of viewers, i.e., a large number of covisitations of the video. To take such potentially large number of viewers into consideration when calculating the recommendation score of video B, the recommendation engine 320 weights the number of covisitations of video A by a scaling factor. For example, 1000 viewers watch video A, then B. Thus, the number of covisitations of both videos A and B is 1000, but the number of covisitation of video A, i.e., 1000, is weighted by a scaling factor of 0.6. The scaled recommendation score for video B is above 15, which is much larger than 1 without scaling. The recommendation engine 320 calculates the scaled recommendation score described above using equation (2) below:

$$\text{score}(\text{video}_B) = \frac{\text{num\_co}(\text{video}_A \cap \text{video}_B)}{\text{num\_co}(\text{video}_A)} \quad (2)$$

where λ is the scaling factor. In one embodiment, λ is set to 0.6. In other embodiments the scaling factor is adjusted to an appropriate value for the application. Furthermore, the recommendation engine 320 may also generate recommendation scores based on other factors, such as the length of the video actually watched, length of the video being recommended, and difference in reviewing time between the central video and its orbiting video being measured, etc. For example, a video being recommended is 1 minute long, and a user actually watches 50%, i.e., 30 seconds, of the video at time t2, while the user watches the central video at t1. The recommendation engine 320, in one embodiment, may take above factors into consideration when calculating recommendations.

Now referring back to FIG. 5, the orbiting videos 512 displayed in the display window 500 are not only related to the central video 510, but also correlated with each other. Such relative correlation is displayed by the relative distance towards each other in the display window 500. Each orbiting video 512 possesses two types of force, i.e., a pulling force and a repelling force, towards another orbiting video 512. These two types of force of an orbiting video 512 together determine its relative position in the display window 500 towards other orbiting videos 512. The pulling force between two orbiting videos 512 pulls the orbiting videos 512 towards each other. The strength of that pulling force is proportional to the recommendation scores of the orbiting videos 512 given the central video 510. The recommendation engine 320 calculates the pulling force of the orbiting videos 512 based on their recommendation scores.

Each orbiting video 512 of a group of recommended videos also has a repelling force towards other orbiting videos 512 in the group. The repelling force pushes the orbiting video 512 away from other orbiting videos 512. The repelling force drops off with the square of distance between two orbiting videos 512. In one embodiment, the recommendation engine 320 weights such pulling force and repelling force among them to calculate the relative correlation among the orbiting videos 512. In one embodiment, the visual presentation event manager 310 receives a group of recommended videos including a central video 510 and its orbiting videos 512. Each of the orbiting video 512 has its recommendation score and its relative distance towards the central video 510 and towards other orbiting videos determined by the recommendation engine 320. The event manager 310 displays the group of recommendations with the central video 510 centered in the display window 500 and its orbiting videos 512 orbiting at their respective distances from the central video 510 and from each other. In one embodiment, the event manager 310 uses a script language, such as Javascript, to generate the updated display window 500 with the recommendations.

In one embodiment, the visual presentation event manager 310 is activated upon a user launching his/her web browser 112. In one embodiment, the event manager 310 generates a page that visually displays a default group of video recommendations that move in accordance with the factors described above. The initial central video of the default group of recommendations can be chosen from various resources. In one embodiment, the visual presentation manager 310 consults the user information database 136, and chooses the central video from a list of the most recently reviewed videos by the user, or from a favorite list of videos of the user. In other embodiments, the visual presentation manager 310 chooses the most popular video among the videos in the video database 138 as the central video, or chooses the central video from an arbitrary list. The visual presentation manager 310 then instructs the recommendation engine 320 to generate the recommendations centered on the chosen initial central video, stores the recommendations in the recommendation repository 330, and notifies the visual presentation manager 310. The visual presentation manager 310 visually displays recommendations.

A user can change a currently selected central video to a new central video by mousing over one of the orbiting videos currently displayed in the browsing window 500. In response to such mouse movement, the visual presentation event manager 310 instructs the recommendation engine 320 to recalculate a group of video recommendations around the new central video over which the mouse is currently pointing. The visual presentation event manager 310 displays the newly generated group of video recommendations in the same browsing window 500 that currently displays the previous group of video recommendations. In an alternative embodiment, the user clicks on one of the orbiting videos to select a new central video. In one embodiment, the video thumbnails move on the display so that the new central video is in the position occupied by video 510 in the display and they are new orbiting videos around the new central video. The old orbiting videos with their central video are displayed next to the new central video and corresponding orbiting videos towards one horizontal side of the display. In one embodiment, the new central video and corresponding orbiting videos move to the display from the various sides of the display screen and gradually settles in their perspective distances determined by the recommendation engine. In another embodiment, the new video recommendations get displayed right their perspective distances by the presentation event manager 310.

To calculate a new group of video recommendations and display it in the same display area with the previously displayed group(s) of video recommendations, the recommendation engine 320 calculates a recommendation score for each recommended video of the new group with the newly selected central video. The recommendation engine 320 further calculates the relative distance in display among the videos of the new group of recommendations and the ones of the previous groups. Taking two groups of recommendations as an example, in one embodiment, the recommendation engine 320 calculates a recommendation score for each orbiting video of the newly selected central video using equation (2) described above. Based on the recommendation scores, the recommendation engine 320 evaluates the pulling and repelling force between orbiting videos 512 to determine their relative distance from the newly selected central video and from each other. In one embodiment, one or more orbiting videos of the newly selected central video is/are the same video(s) as the ones in the previous group of recommendations. That indicates that the same video(s) is/are recommended by multiple recommendations. In such circumstance, the recommendation score calculation for a multiple-recommended video includes the covisitation data from both central videos and the video itself. For example, if two different orbiting videos are "pulling" on the same video, the orbiting video with higher recommendation score "pulls" the video with larger pulling force. This indicates that the video being pulled has a closer correlation with the orbiting video having larger pulling force than the other pulling orbit video. As a result, the video being pulled is to be displayed closer to the orbiting video with larger pulling force and moves from its current location to its new location. A similar procedure is applicable to larger number of groups of recommendations. The recommendations no longer recommended go off the display screen if the total number of recommendations exceeds the limit threshold for the display.

To avoid overcrowding of a display window by multiple groups of recommendations, in one embodiment, the default maximum number of videos for each group of recommendations is set to 10, and a total number of videos that can be displayed together in a display is 30. In response to reaching the total number of videos limit, the visual presentation event manager 310 automatically discards the videos with the lower recommendations scores from the earliest displayed group of recommendations while keeping the videos from a later group of recommendations in display. In another embodiment, the visual presentation event manager 310 keeps a global order of recommendation scores of videos currently being displayed. In response to reaching the total number of videos limit, the visual presentation event manager 310 automatically discards videos with lower recommendation scores starting with the lowest one among all recommendation scores.

Figure 6:
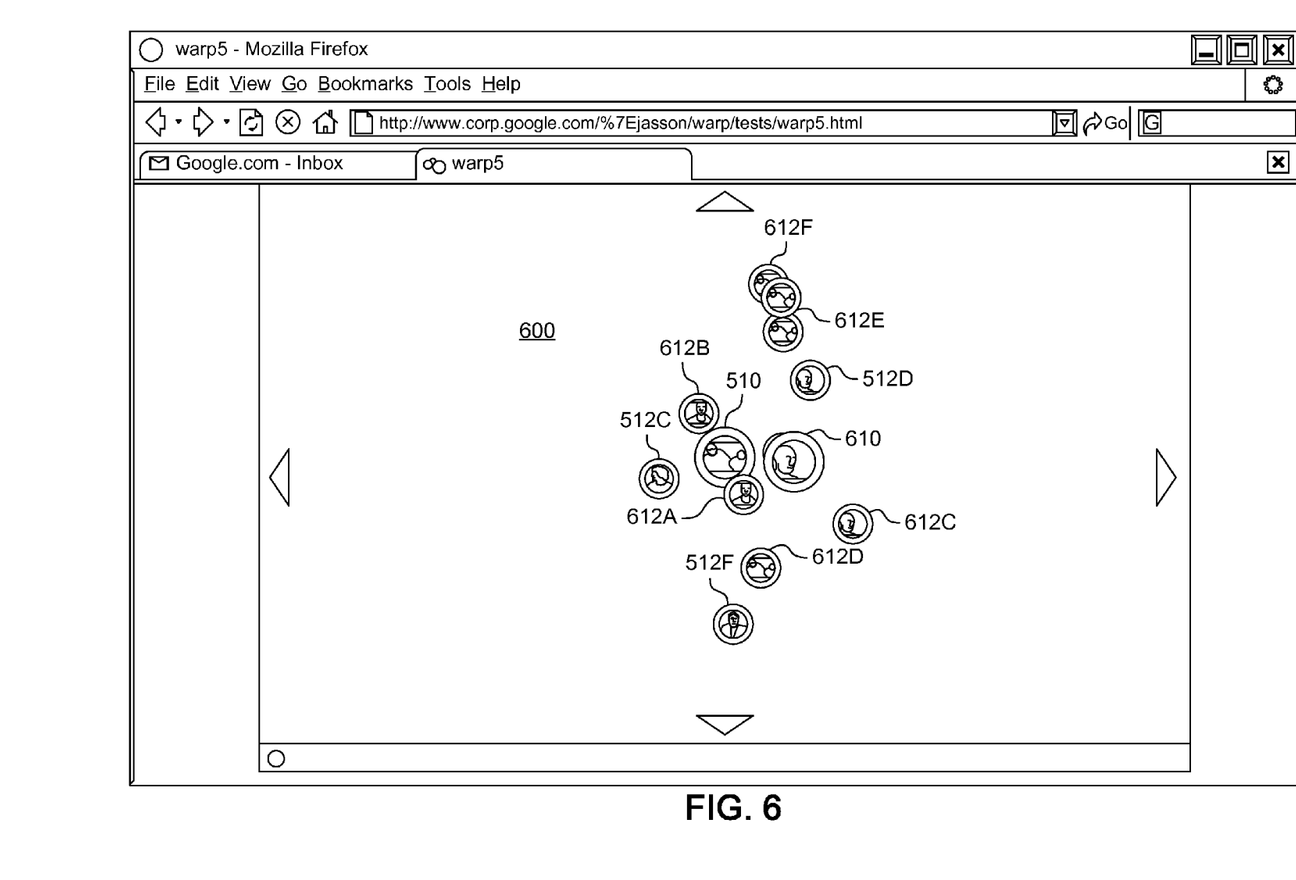
FIG. 6 illustrates a web page implementing an exemplary interface for visually presenting multiple groups of video recommendations in a display area according to one embodiment.

Turning now to FIG. 6, FIG. 6 illustrates a web page implementing an exemplary interface of visually presenting two groups of video recommendations in the same display area 600 according to one embodiment. The two groups of recommendations are displayed using different reference numbers for clarity of illustration. For example, the central video of the first group of recommendations is 510 and its orbiting videos are 512s, 512A-512F. The central video of the new group of recommendations is 610 and its orbiting videos are 612s, 612A-612F. In this circumstance, the first group of recommendations is first displayed in the display area 600. Its central video 510 is centered in the display area 600 and its orbiting videos 512s are orbiting around it according to their relativeness to the central video 510 and their correlation toward each other.

The user of browsing the first group of recommendations later changes his/her interest by mousing over to his/her new interest, i.e., 610, which becomes the central video of the second group of recommendations. The recommendation engine 320 calculates the recommendation score for each orbiting videos 612s using equation (2) with respect to the central video 610. For multiple-recommended orbiting videos 612s, the recommendation engine 320 calculates its recommendation score as described above. As a result, the second group of recommendations is displayed as illustrated in FIG. 6. It is noted that the visual presentation event manager 310 displays the newly selected central video 610 in a larger video icon than its orbiting videos, 612A-612F.

Figure 4:
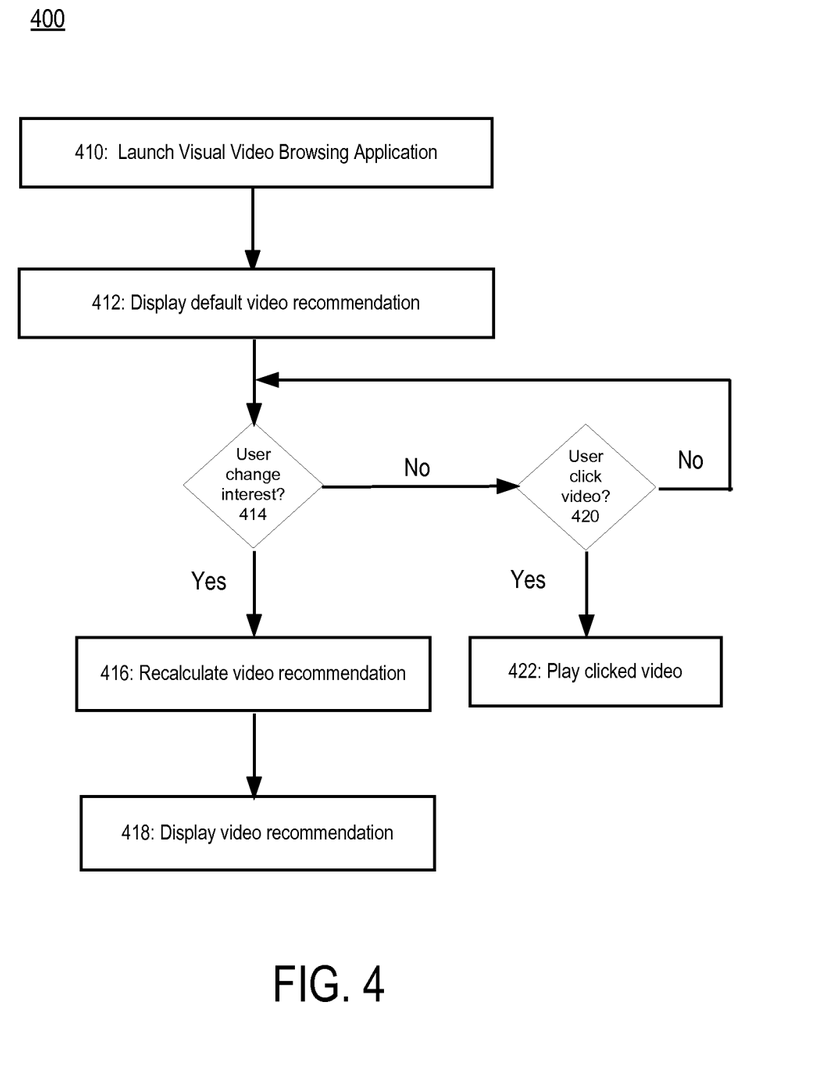
FIG. 4 is a process flow for providing visual presentation of browsing video recommendations according to one embodiment.

FIG. 4 is a process flow of providing visual presentation of browsing video recommendations according to one embodiment. Other embodiments perform different and/or additional steps than the ones described here. Moreover, other embodiments perform steps in different orders.

Initially, the system launches 410 the visual video browsing application when a user logs into the system. The system displays 412 a group of default video recommendations by the visual presentation event manager 310. The default central video is selectable from a variety of video sources, such as the user's favorite list of videos. A recommendation video is related to the central video based on its recommendation score, and is further related to other videos of the group. The visual presentation event manager 310 displays the recommended videos at their corresponding display distance from the central video and from each other. The visual presentation event managers monitors 414 the user event such as user mousing over a video different than the current central video. In response to user changing the current central video, the visual presentation event manager 310 instructs the recommendation engine 320 to recalculate 416 the group of video recommendations around the newly selected central video. The visual presentation event manager 310 displays 418 the newly calculated group of recommendations in the display area together with previously displayed videos. In response to user clicking 420 a video for playing, the visual presentation event manager 310 instructs the video server 134 to retrieve the selected video from the video database 138, and streams the selected video for the user to play 422. Some embodiments may pre-fetch videos to reduce latency time for video loading.

Figure 7:
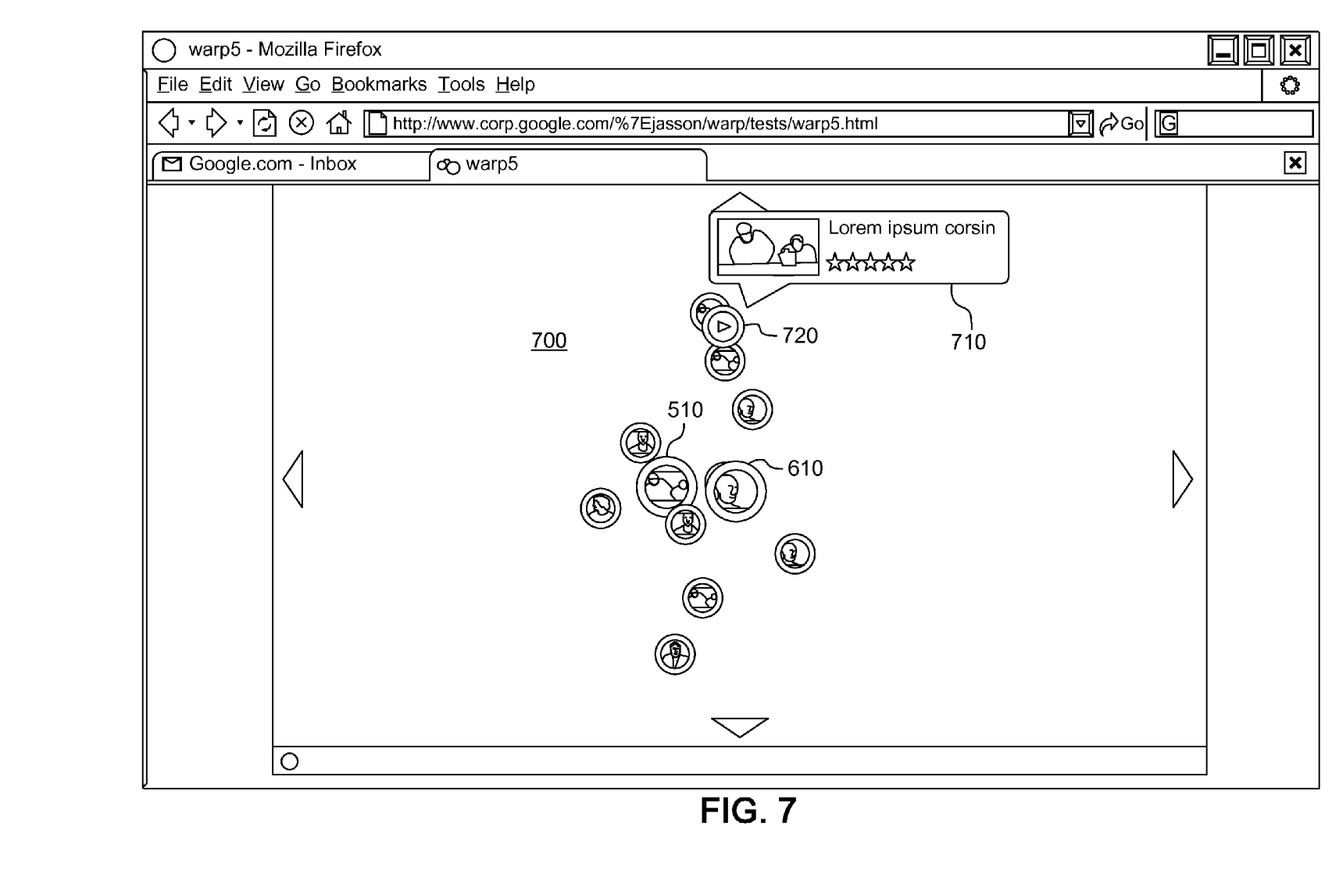
FIG. 7 illustrates a web page implementing an exemplary interface in a ready-to-play mode of operation according to one embodiment.

As mentioned above, in addition to visually presenting video recommendations for users to browse, system 130 also allows a client to select a video and play the selected video. FIG. 7 illustrates a web page implementing an exemplary interface of the system in a ready-to-play mode of operation according to one embodiment. The interface includes a browsing window 700 and two groups of video recommendations with their central videos 510 and 610, respectively. The two groups of recommendations presents visually the browsing activities described in FIG. 5 and FIG. 6. The interface also includes an explanation banner 710 and a play button symbol 720 associated with the selected video. The explanation banner 710 provides more content information including a larger thumbnail image of the key frame of selected video, a title and rating (i.e., the five star symbols). The play button symbol 720 indicates the system 130 is ready to play the selected video for the user. In one embodiment, the play button changes from a thumbnail of the video to a "play" indicator, such as the play button symbol 720 shown when the user mousse over the video thumbnail. Explanation banner 710 also appears in response to a mouseover or other selection indication. When the user clicks the play button 720 (or otherwise indicates a desire to play the selected video), the system 130 instructs the video server 134 to locate the user selected video from the video database 138 and starts streaming the selected video to the client 110. Some embodiments may preload videos to reduce latency.

Figure 8:
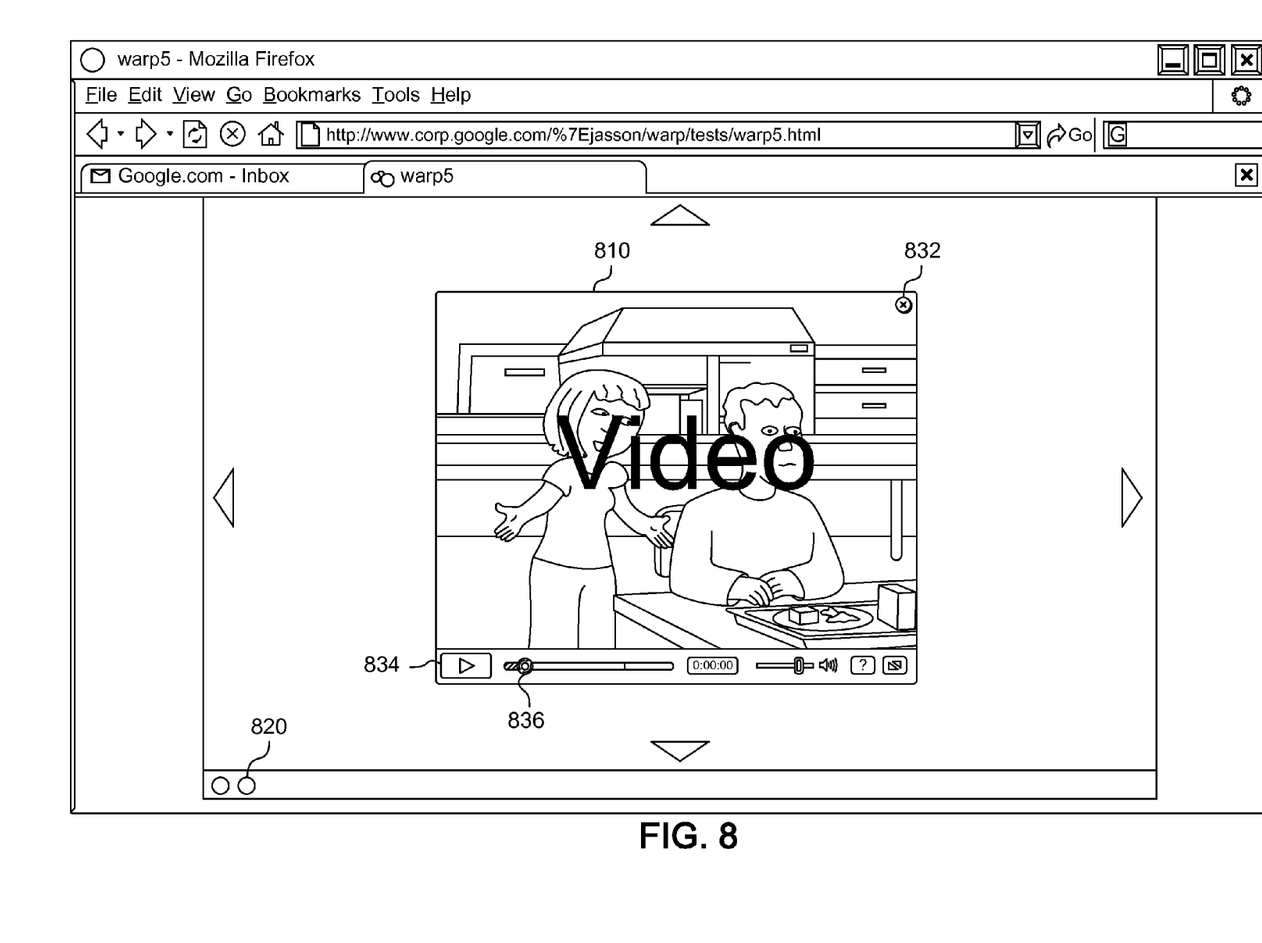
FIG. 8 illustrates an exemplary interface for playing a selected video according to one embodiment.

FIG. 8 illustrates an exemplary interface for playing a selected video according to one embodiment. The interface includes a video player display window 810 showing the video currently being played, a type of service indicator 820 (in this circumstance, it is a streaming service), the player's play button 834, a progress indicator 836 and close button 832.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for presenting video recommendations, comprising:

receiving a first group of video recommendations in response to a selection of a first video, each video recommendation in the first group of video recommendations having a recommendation score and each video recommendation being represented by a video icon;

displaying the video icons representing the video recommendations of the first group of video recommendations around a video icon representing the first video in a display area, wherein each video icon representing a video recommendation in the first group is displayed at a location in the display area, the location for a respective video recommendation in the first group being determined based on relative correlation between the respective video recommendation and the first video and relative correlation among the respective video recommendation and other video recommendations in the first group;

recalculating a group of video recommendations in response to hovering over a video recommendation of the first group of video recommendations, the recalculated group of recommendations forming a second group of video recommendations, each video recommendation in the second group of video recommendations having a recommendation score and each video recommendation being represented by a video icon; and displaying a respective video recommendation in the second group at a location in the same display area, the location determined based, in part, on relative correlation among the respective video recommendation in the second group and other video recommendations in the second group and relative correlation among the respective video recommendation in the second group and the video recommendations in the first group wherein the relative correlation between two video recommendations is measured by a weighted pulling force and repelling force between the two video recommendations, the pulling force and repelling force between the two video recommendations being related to the recommendation scores of the two video recommendations.

2. The method of claim 1, wherein displaying the video icons representing the video recommendations of the first group of video recommendations comprises:

displaying the first group of video recommendations so that the video icons representing the video recommendations in the first group are around the video icon representing the first video at distances proportional to the video recommendations' recommendation scores.

3. The method of claim 2, wherein displaying the video icons representing the video recommendations of the first group of video recommendations comprises:
   adjusting a distance between a video icon representing a respective video recommendation in the first group and video icons representing other video recommendations in the first group, the distance adjusted being proportional to the recommendation score of the respective video recommendation relative to the recommendation scores of the other recommendations in the first group.

4. The method of claim 1, wherein displaying the video icons representing the video recommendations comprises:
   removing one or more video icons representing one or more video recommendations from the display area in response to a total number of video recommendations to be displayed exceeding a threshold value.

5. The method of claim 1, wherein a pulling force of a video recommendation toward another video recommendation measures a relative relatedness between the video recommendation and the another video recommendation.

6. The method of claim 1, wherein the recommendation score of a respective video recommendation in the first group relative to the first video is based in part on a probability of the respective video recommendation being viewed after the first video being viewed.

7. The method of claim 1, further comprising:
   ranking recommendation scores associated with video recommendations currently displayed in the same display area;
   responsive to a total number of video recommendations to be displayed exceeding a threshold value, removing one or more video icons representing one or more video recommendations with low recommendation scores from the display area.

8. A non-transitory computer-readable storage medium storing executable computer program instructions for presenting video recommendations, the computer program instructions executable to perform steps comprising:
   receiving a first group of video recommendations in response to a selection of a first video, each video recommendation in the group of video recommendations having a recommendation score and each video recommendation being represented by a video icon;
   displaying the video icons representing the video recommendations of the first group of video recommendations around a video icon representing the first video in a display area, wherein each video icon representing a video recommendation in the first group is displayed at a location in the display area, the location for a respective video recommendation in the first group being determined based on relative correlation between the respective video recommendation and the first video and relative correlation among the respective video recommendation and other video recommendations in the first group;
   recalculating a group of video recommendations in response to hovering over a video recommendation of the first group of video recommendations, the recalculated group of recommendations forming a second group of video recommendations, each video recommendation in the second group of video recommendations having a recommendation score and each video recommendation being represented by a video icon; and
   displaying a respective video recommendation in the second group at a location in the same display area, the location determined based, in part, on relative correlation among the respective video recommendation in the second group and other video recommendations in the second group and relative correlation among the respective video recommendation in the second group and the video recommendations in the first group, wherein the relative correlation between two video recommendations is measured by a weighted pulling force and repelling force between the two video recommendations, the pulling force and repelling force between the two video recommendations being related to the recommendation scores of the two video recommendations.

9. The computer-readable storage medium of claim 8, wherein displaying the video icons representing the video recommendations of the first group of video recommendations comprises:
   displaying the first group of video recommendations so that the video icons representing video recommendations in the first group are around the video icon representing the first video at distances proportional to the video recommendations' recommendation scores.

10. The computer-readable storage medium of claim 9, wherein displaying the video icons representing the video recommendations of the first group of video recommendations comprises:
    adjusting a distance between a video icon representing a respective video in the first group of video recommendations and other video icons representing other video recommendations in the first group, the distance adjusted being proportional to the recommendation score of the respective video recommendation relative to the recommendation scores of the other video recommendations in the first group.

11. The computer-readable storage medium of claim 8, wherein displaying the video icons representing the video recommendations comprises:
    removing one or more video icons representing one or more video recommendations from the display area in response to a total number of video recommendations to be displayed exceeding a threshold value.

12. The computer-readable storage medium of claim 8, wherein a pulling force of a video recommendation toward another video recommendation measures a relative relatedness between the video recommendation and the another video recommendation.

13. The computer-readable storage medium of claim 8, wherein the recommendation score of a respective video recommendation in the first group relative to the first video is based in part on a probability of the respective video recommendation being viewed after the first video being viewed.

14. A computer system for determining viewing recommendations, comprising:
    a non-transitory computer-readable storage medium storing executable computer program instructions, the computer program instructions comprising instructions for:
        receiving a first group of video recommendations in response to a selection of a first video, each video recommendation in the group of video recommendations having a recommendation score and each video recommendation being represented by a video icon;
        displaying the video icons representing the video recommendations of the first group of video recommendations around a video icon representing the first video in a display area, wherein each video icon representing a video recommendation in the first group is displayed at a location in the display area, the location for a respective video recommendation in the first group being determined based on relative correlation between the respective video recommendation and the first video and relative correlation among the respective video recommendation and other video recommendations in the first group;

recalculating a group of video recommendations in response to hovering over a video recommendation of the first group of video recommendations, the recalculated group of recommendations forming a second group of video recommendations, each video recommendation in the second group of video recommendations having a recommendation score and each video recommendation being represented by a video icon; and;

displaying a respective video recommendation in the second group at a location in the display area, the location determined based, in part, on relative correlation among the respective video recommendation in the second group and other video recommendations in the second group relative correlation among the respective video recommendation in the second group and the video recommendations in the first group, wherein the relative correlation between two video recommendations is measured by a weighted pulling force and repelling force between the two video recommendations, the pulling force and repelling force between the two video recommendations being related to the recommendation scores of the two video recommendations; and a processor which executes the computer program instructions stored by the non-transitory computer-readable storage medium.

15. The system of claim 14, wherein displaying the video icons representing the video recommendations of the first group of video recommendations comprises:

displaying the video icons representing the video recommendations of the first group of video recommendations so that the video icons representing the video recommendations in the first group are around the video icon representing the first video at a distance proportional to the video recommendations' recommendation scores.

16. The system of claim 15, wherein displaying the video icons representing the video recommendations of the first group of video recommendations comprises:

adjusting a distance between a video icon representing a respective video in the first group of video recommendations and other video recommendations in the first group, the distance adjusted being proportional to the recommendation score of the respective video recommendation relative to the recommendation scores of the other video recommendations in the first group.

17. The system of claim 14, wherein a pulling force of a video recommendation toward another video recommendation measures a relative relatedness between the video recommendation and the another video recommendation.

\* \* \* \* \*